(12) United States Patent
Shelton

(10) Patent No.: US 8,128,026 B2
(45) Date of Patent: Mar. 6, 2012

(54) REMOVABLE CARGO POD WITH LIFTING MECHANISM AND OPEN TOP

(76) Inventor: David Barbour Shelton, Winnetka, IL (US)

( * ) Notice: Subject to any disclaimer, the term of this patent is extended or adjusted under 35 U.S.C. 154(b) by 711 days.

(21) Appl. No.: 12/218,120

(22) Filed: Jul. 12, 2008

(65) Prior Publication Data

US 2009/0014583 A1 Jan. 15, 2009

Related U.S. Application Data

(60) Provisional application No. 60/959,198, filed on Jul. 12, 2007.

(51) Int. Cl.
*B64C 1/20* (2006.01)
(52) U.S. Cl. .................................................. 244/118.2
(58) Field of Classification Search ............... 244/137.1, 244/118.2, 137.4; 294/68.1, 82.27, 82.26, 294/68.3; 89/1.54; 254/199, 418, 338; 248/188.4
See application file for complete search history.

(56) References Cited

U.S. PATENT DOCUMENTS

| D149,555 | S | * | 5/1948 | Hibbard | D12/345 |
| 3,028,130 | A | * | 4/1962 | Burton | 244/137.1 |
| 5,129,601 | A | * | 7/1992 | Henkel | 244/173.3 |
| 5,190,250 | A | * | 3/1993 | DeLong et al. | 244/137.1 |
| 7,044,423 | B2 | * | 5/2006 | Bober et al. | 248/188.4 |

OTHER PUBLICATIONS

Wikipedia Welbike Article (http://en.wikipedia.org/wiki/Welbike), Development Section, Mar. 1, 2011.*

* cited by examiner

*Primary Examiner* — Timothy D Collins
*Assistant Examiner* — Nicholas McFall

(57) ABSTRACT

A removable cargo pod for attachment to an aircraft fuselage; a mechanism in said pod to raise and lower it into and from engagement with the fuselage; and an open top so as to provide access to the interior while it is vertically displaced or removed from the fuselage.

2 Claims, 6 Drawing Sheets

US 8,128,026 B2

REMOVABLE CARGO POD WITH LIFTING MECHANISM AND OPEN TOP

FIELD OF THE INVENTION

The present invention pertains in general to cargo pods for aircraft. More particularly, the invention relates to a removable cargo pod for attachment to the belly of a light aircraft.

BACKGROUND

Conventional cargo pods are attached to the exterior of an aircraft with a plurality of fasteners in a semi-permanent manner. Such attachment means does not permit quick installation or removal of the pod. Furthermore, such cargo pods provide no means to lift, lower or align the pod during the installation and removal.

Hatches, located in the sides and/or rear, are the only means to access the interior of a conventional cargo pod. Cargo is thereby restricted to items that are smaller than the hatch. Also, it can be difficult to access all sides of the cargo so that it may be properly positioned and secured. Furthermore, antennas, wings, landing gear and other airframe components sometimes reduce useful access to the pod.

In U.S. Pat. No. 5,961,071 Proctor teaches the use of latches to attach a sealable cargo pod to a light aircraft. While the use of latches accelerates the installation and removal of such a pod, no means is provided to raise and lower the pod during these processes. Installation would therefore be challenging when external equipment or assistance is not available. Furthermore, he teaches the use of conventional hatches and the sealed design prohibits access through the top of the pod.

In U.S. Pat. No. 5,820,075 Speaks teaches a slidably mounted cargo pod for improved access to the interior of the pod. However, access is hindered due to the close proximity to the aircraft fuselage. Furthermore, he provides no means to raise or lower the pod during installation or removal.

SUMMARY OF THE INVENTION

A cargo pod is provided with a lifting mechanism in said pod to raise and lower the pod to and from engagement with the aircraft fuselage. The lifting mechanism may be a winch, jack or similar device, properly configured to raise and lower the pod, even while said pod is loaded to a gross weight with luggage or cargo. The pod has an open top, through which the interior may be accessed while said pod is vertically separated or removed from the aircraft fuselage. The pod has an upper peripheral edge, which mates with the undersurface of the fuselage so as to form a sealed container when the pod and fuselage are brought together. The pod and aircraft fuselage have mating attachment fittings that provide a structural connection during flight.

The disclosed invention enables several useful functions:

A) The pod may be easily installed or removed from the aircraft fuselage, eliminating unnecessary weight and drag when the cargo pod is not needed. By providing a means to lift and lower itself to and from the fuselage, there is a reduced need for external equipment, assistance or heavy lifting.

B) The pod may be quickly disconnected from the aircraft fuselage and lowered vertically as a means to access the interior of said pod. The combination of a vertical displacement between the pod and fuselage, as well as an open top of the pod, allows access to all sides of the cargo. Cargo may therefore be properly loaded, positioned and secured. Then, the pod may be raised against the fuselage and structurally connected for flight.

C) The pod may be loaded or unloaded while it is disconnected from and located away from the aircraft. Large or bulky items may be loaded through the open top. Furthermore, loading or unloading of the pod may be accomplished without interference from wings, landing gear, antennas or other airframe components. After loading, the pod may be re-positioned beneath the aircraft, raised against the fuselage and structurally connected for flight.

D) Since many airports do not have ground transportation services, it is another goal of the invention to carry a motorcycle. After removing the pod from an aircraft, it may be tilted onto its side so as to load a motorcycle in a vertical attitude. The loaded pod may then be tilted back to the horizontal attitude and re-attached to the aircraft using the steps taught herein.

DETAILED DESCRIPTION

Figure 1:
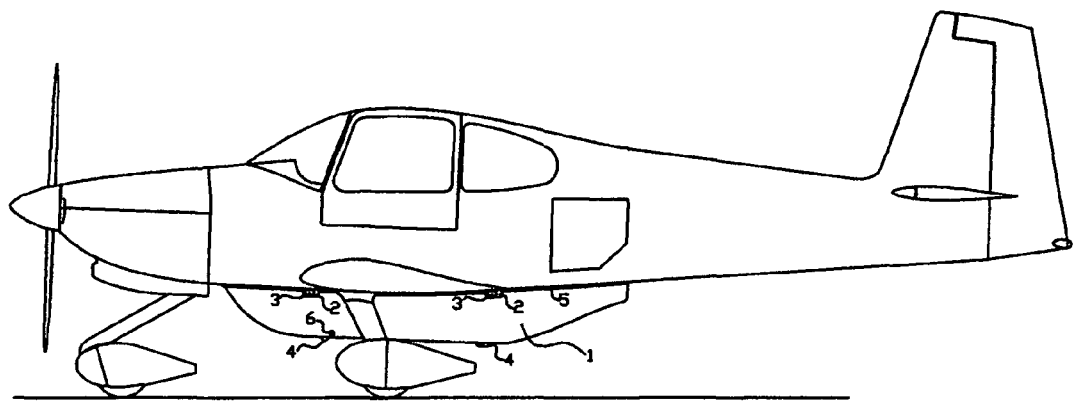
FIG. 1 shows a cargo pod attached to the belly of an aircraft.

FIG. 1 shows a cargo pod 1 beneath an aircraft fuselage. The pod is structurally attached to the aircraft by the engagement of fuselage fittings 3 and pod fittings 2. The upper peripheral edge of the pod comprises a compressible rubber seal 5 that conforms to the belly of the aircraft fuselage. A drive shaft 6 for the operation of an integral lifting mechanism, in this case a screw winch, is accessible from outside the pod.

Figure 2:
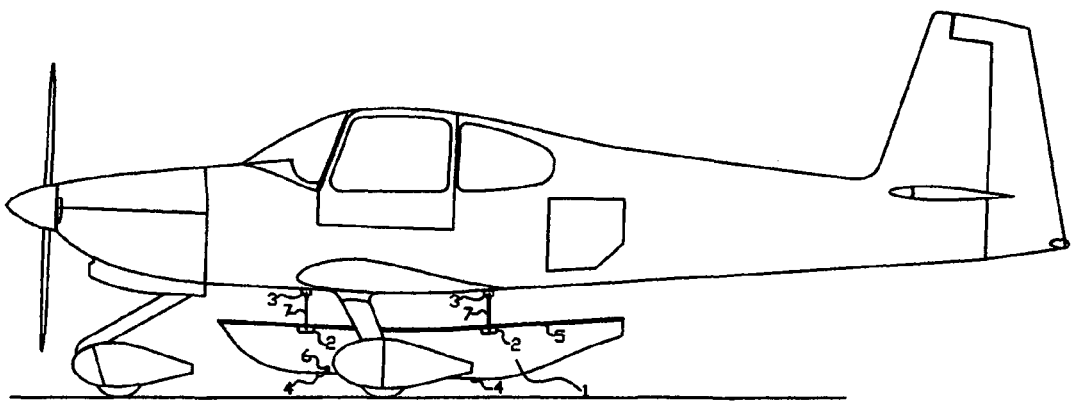
FIG. 2 shows a cargo pod being raised to, or lowered from the belly of an aircraft.

FIG. 2 shows a cargo pod 1, displaced vertically from an aircraft fuselage. The pod is shown suspended by cables 7 which are part of the integral lifting mechanism. The pod has an open top and the vertical gap between the aircraft and pod allows access to the interior of said pod. While the pod is displaced vertically as shown, it is possible to insert or remove, position and secure cargo within the pod.

The pod may be re-attached to the aircraft by turning the drive shaft 6 so as to retract the cables 7 and raise the pod 1 against the belly of the aircraft. The fittings on the pod 2 and aircraft 3 are then locked together to provide a structural connection during flight.

The pod may be removed from the aircraft by turning the drive shaft 6 so as to extend the cables 7 and lower the pod 1 to the ground. The cables 7 may then be disconnected from the fuselage. With the pod resting upon wheels 4, it may then be rolled from beneath the aircraft.

Figure 3:
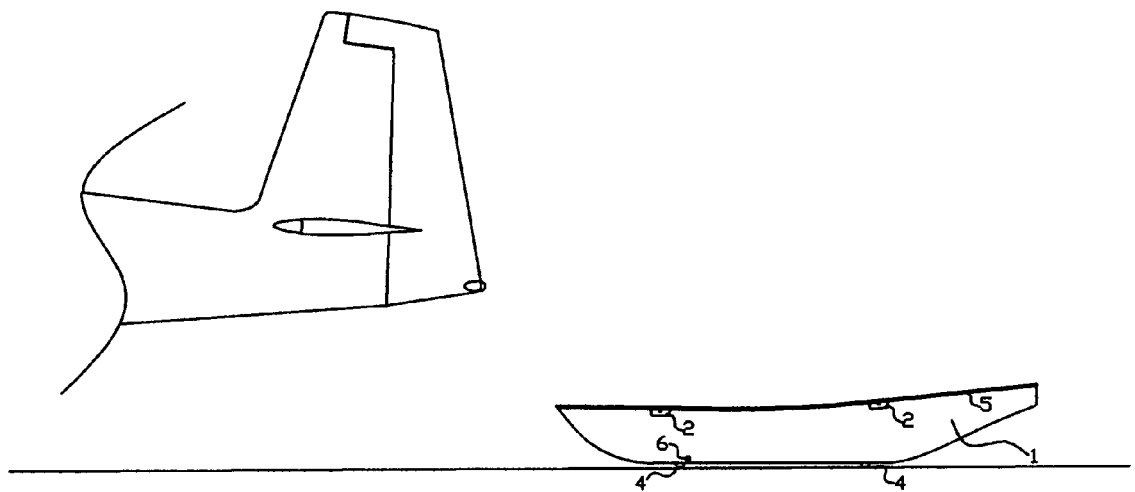
FIG. 3 shows a cargo pod removed from an aircraft.

FIG. 3 shows a cargo pod 1 separated from and positioned away from the aircraft. The pod rests upon wheels 4 so that it may be rolled to or from beneath the aircraft. With the pod separated from the aircraft as shown, large or bulky cargo may be loaded through the open top of the pod. Furthermore, the pod may be loaded or unloaded without interference from the aircraft wings, landing gear, antennas or other airframe components.

The pod may be re-attached to the aircraft as follows; first, roll the pod 1 beneath the aircraft. Next, connect the lifting cables (7, FIG. 2) to the belly of the aircraft. Then, turn the drive shaft 6 so as to retract the cables and raise the pod 1 against the aircraft fuselage. Finally, lock together the fittings on the pod and aircraft to provide a structural connection during flight.

Figure 4:
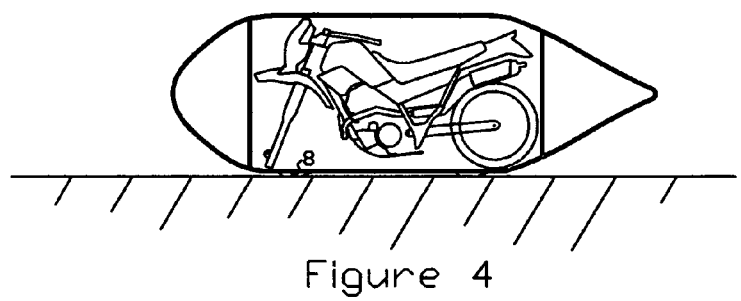
FIG. 4 shows a pod that has been tilted upright for loading or unloading.

FIG. 4 shows a pod that has been tilted upright onto its side to facilitate the loading of a motorcycle. The pod rests upon streamlined skids 8 so as to protect the exterior surfaces of said pod. After loading the motorcycle in a vertical attitude, the pod may be tilted back to the horizontal attitude. The pod, with motorcycle therein, may then be re-attached to the aircraft fuselage as described previously herein.

When carrying a motorcycle within a cargo pod, it is advisable to install drain holes and air vents as a matter of fire safety. It is also advisable to install cradles or fixtures to constrain the motorcycle during flight. Folding handlebars and pegs may be necessary to fit the motorcycle within the cargo pod.

Figure 5A:
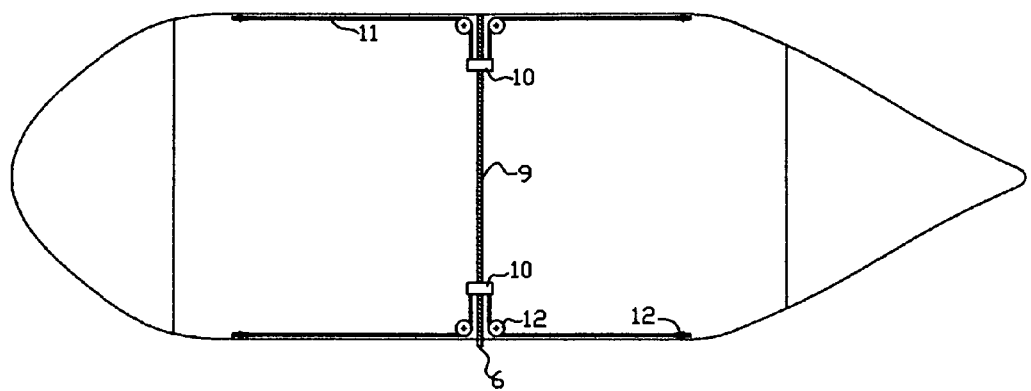
FIG. 5A shows a top view of a cargo pod and lifting mechanism, with the lifting mechanism in an extended position.
Figure 5B:
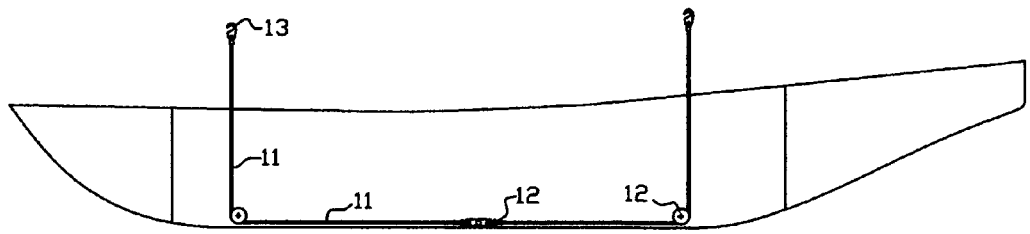
FIG. 5B shows a side view of a cargo pod and lifting mechanism, with the lifting mechanism in an extended position.

FIG. 5A shows a top view of a cargo pod in which the lifting mechanism is a screw winch. FIG. 5B shows a side view of the same. The function of the screw winch may be performed by a drum winch or similar device, however, the screw winch is preferred for its precise motion. Rotating the external drive shaft 6 with a wrench, speed bar or similar tool drives the screw 9. As the screw 9 turns, the threaded blocks 10 move along the screw. The lifting cables 11 are attached to the blocks such that movement of the blocks in one direction retracts the cables and movement of the blocks in the other direction extends the cables. The lifting cables 11 are routed by pulleys 12 to their desired suspension points. The cables terminate with hooks 13 that may be attached to or removed from the belly of the aircraft.

Figure 6A:
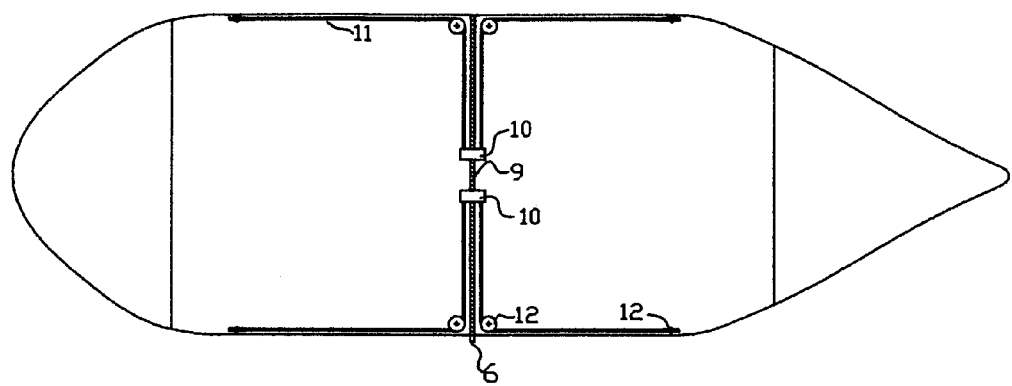
FIG. 6A shows a top view of a cargo pod and lifting mechanism, with the lifting mechanism in a retracted position.
Figure 6B:
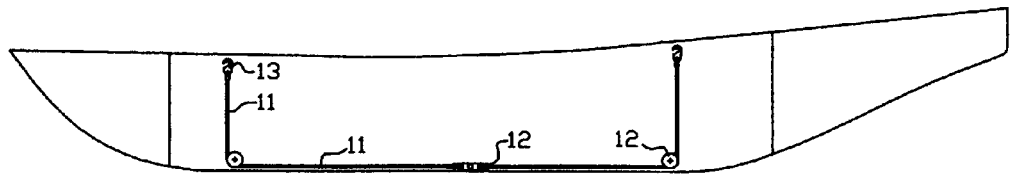
FIG. 6B shows a side view of a cargo pod and lifting mechanism, wherein the lifting mechanism is retracted.

FIGS. 6A and 6B show the cargo pod of FIGS. 5A and 5B respectively, where-in the threaded blocks 10 have moved along the screw 9 so as to retract the lifting cables 11. By attaching the hooks 13 to the belly of the aircraft, then retracting the lifting cables 11, the pod 1 may be raised to engagement with the fuselage.

Figure 7:
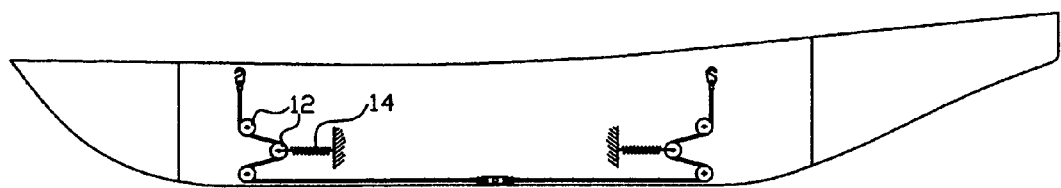
FIG. 7 shows a side view of a cable tensioning system.

FIG. 7 shows a side view of a cable tensioning system. Additional pulleys 12 and springs 14 have been added so as to retract excess or slack cable. The spring and pulleys will retract excess cable so as to prevent it from becoming tangled or derailing from pulleys.

Figure 8:
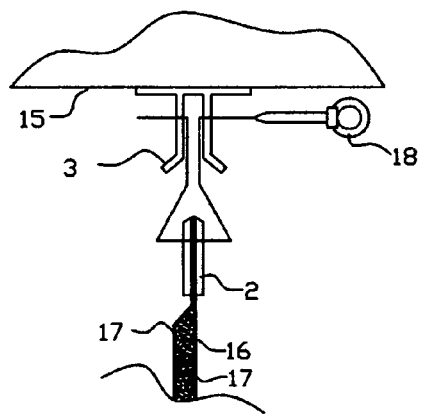
FIG. 8 shows a cross-sectional view of an attachment fitting.

FIG. 8 shows a cross-sectional view of attachment fittings. The fuselage fitting 3 is attached to a reinforced area of the fuselage belly 15. The pod fitting 2 is attached to the upper peripheral edge of the pod. The pod sidewall is shown comprised of a foam core 16 with fiberglass facings 17. The fittings on the pod and fuselage are chamfered and bent respectively to provide alignment as the fittings are brought together. During flight, the fittings are locked together by inserting a pin 18 into a hole that is common to both fittings.

Figure 9A:
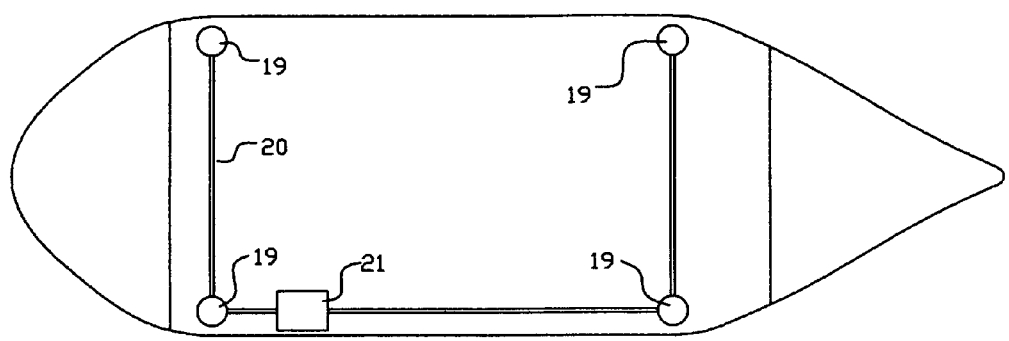
FIG. 9A shows a top view of a cargo pod wherein the raising and lowering mechanism comprises a plurality of hydraulic jacks.
Figure 9B:
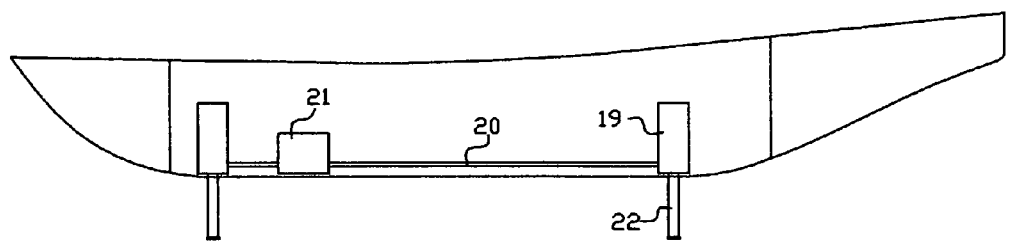
FIG. 9B shows a side view of a cargo pod wherein the raising and lowering mechanism comprises a plurality of hydraulic jacks.

FIGS. 9A and 9B show a cargo pod wherein the raising and lowering mechanism comprises a plurality of hydraulic jacks 19, pressure hoses 20 and a hydraulic pump 21. In this example, the hydraulic pump supplies pressure, through the pressure hoses, to the hydraulic jacks. The hydraulic pressure causes the jacks to extend their pistons 22 downwardly so as to raise the pod upwardly for engagement to the fuselage.

I claim:

1. The method of loading and installing an open top aircraft cargo pod, comprising:

Providing an open top and removable cargo pod; disengaging the cargo pod from beneath a fuselage of an aircraft; tilting the cargo pod onto a lateral side; loading the cargo pod through the open top, while the pod is positioned on a lateral side; tilting the loaded cargo pod back to a level attitude with the open pod top facing updwardly; positioning the loaded cargo pod beneath the aircraft fuselage; and raising the loaded cargo pod into engagement with the aircraft fuselage, whereby the cargo pod forms a sealed container against the belly of the aircraft.

2. The method of claim 1 in which the cargo is a motorcycle.

* * * * *